United States Patent
Spoon

(10) Patent No.: US 9,652,358 B1
(45) Date of Patent: May 16, 2017

(54) TYPE WIDENING FOR SOURCE CODE ANALYSIS

(71) Applicant: Semmle Limited, Oxford (GB)

(72) Inventor: Alexander Spoon, Atlanta, GA (US)

(73) Assignee: Semmle Limited, Oxford (GB)

( * ) Notice: Subject to any disclaimer, the term of this patent is extended or adjusted under 35 U.S.C. 154(b) by 0 days.

(21) Appl. No.: 15/164,656

(22) Filed: May 25, 2016

Related U.S. Application Data

(60) Provisional application No. 62/322,508, filed on Apr. 14, 2016.

(51) Int. Cl.
*G06F 9/45* (2006.01)
*G06F 11/36* (2006.01)

(52) U.S. Cl.
CPC .................. *G06F 11/3604* (2013.01)

(58) Field of Classification Search
CPC ........................................ G06F 8/443
See application file for complete search history.

(56) References Cited

U.S. PATENT DOCUMENTS

| | | | |
|---|---|---|---|
| 6,412,019 B1 | 6/2002 | Gibbons et al. | |
| 6,687,898 B2 | 2/2004 | Chen et al. | |
| 6,795,963 B1 * | 9/2004 | Andersen | G06F 11/3628 714/E11.209 |
| 7,107,581 B2 | 9/2006 | Schwabe et al. | |
| 7,620,944 B2 | 11/2009 | Beccario et al. | |
| 7,934,207 B2 | 4/2011 | Gustafsson et al. | |
| 2005/0097532 A1 * | 5/2005 | Beccario | G06F 8/437 717/141 |
| 2010/0162219 A1 * | 6/2010 | Bowler | G06F 11/366 717/154 |
| 2013/0339926 A1 | 12/2013 | Raundahl Gregersen et al. | |
| 2014/0040860 A1 * | 2/2014 | Darcy | G06F 8/437 717/114 |
| 2014/0123109 A1 | 5/2014 | Goetz et al. | |
| 2016/0042013 A1 | 2/2016 | Fan et al. | |

* cited by examiner

*Primary Examiner* — Hang Pan
(74) *Attorney, Agent, or Firm* — Fish & Richardson P.C.

(57) ABSTRACT

Methods, systems, and apparatus, including computer programs encoded on computer storage media, for generating widened types for static analysis. One of the methods includes receiving an output generated by a program parser for a source code file, wherein the output identifies a respective original type for each of one or more source code elements in the source code file. A respective widened type name is generated for each of one or more source code elements in the output, the widened type name being different from an original type name of the original type of the source code element. Static analysis are generated results for the source code file, wherein the static analysis results reference each source code element of the one or more source code elements by a respective widened type name for the source code element instead of by a respective original type name of the source code element.

33 Claims, 14 Drawing Sheets

TYPE WIDENING FOR SOURCE CODE ANALYSIS

BACKGROUND

This specification relates to static analysis of software source code.

Static analysis refers to techniques for analyzing computer software source code without executing the source code as a computer software program. Static analysis systems analyze source code to determine various properties about source code in a code base.

Static analysis systems can identify characteristic segments of source code in the code base. A characteristic segment of source code is a segment of source code having a particular attribute of interest. Static analysis systems can generate analysis results that include data specifying where, in the code base, the characteristic segments of source code occur.

An example of characteristic segments of source code that static analysis systems can generate is source code coding defects. Coding defects are segments of source code that violate one or more coding standards or rules. The data representing such coding defects may be referred to as violations. Such programming errors may not be flagged by compilers or interpreters as errors and thus may go undetected by software developers.

Common violations identified by static analysis systems include type violations, which are characteristic snippets of source code that violate coding standards for how types should be used. In general, a type is a property of a programming language construct. A type determines how the programming language construct can be used in relation to other programming language constructs according to type rules enforced by a compiler or interpreter of the programming language.

Type violations are coding defects that may or may not be considered errors by the compiler or interpreter, but nevertheless represent defects in the code base. Type violations typically include two primary instances: comparison between two incompatible types, and an argument being passed a type that is incompatible with an expected type for the argument. For example, a segment of source code that compares variables of incomparable types is a coding defect that can be represented by a corresponding violation that identifies the location of the source code in the code base, the offending source code itself, and an error message "comparison between variables of incomparable types."

As type systems of programming languages become more sophisticated, it becomes more difficult for static analysis systems to report understandable information about violations involving types. Consequently, it becomes harder for users to use static analysis systems that do not provide comprehensible information about violations involving types.

SUMMARY

This specification describes how a static analysis system can generate widened types from original types of a programming language. The widened types simplify the implementation of program analysis and provide more intuitive static analysis results than the original types, particularly for programming languages having very sophisticated typing systems.

Particular embodiments of the subject matter described in this specification can be implemented so as to realize one or more of the following advantages. Generating widened types results in more intuitive and useful static analysis results. Users are less likely to be confused about how to fix coding defects in a code base. Thus, users are less likely to report identified coding violations as false positives, and are more likely to take steps to fix the coding defect. Using widened types makes it easier to implement static analyzers that inspect type information.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
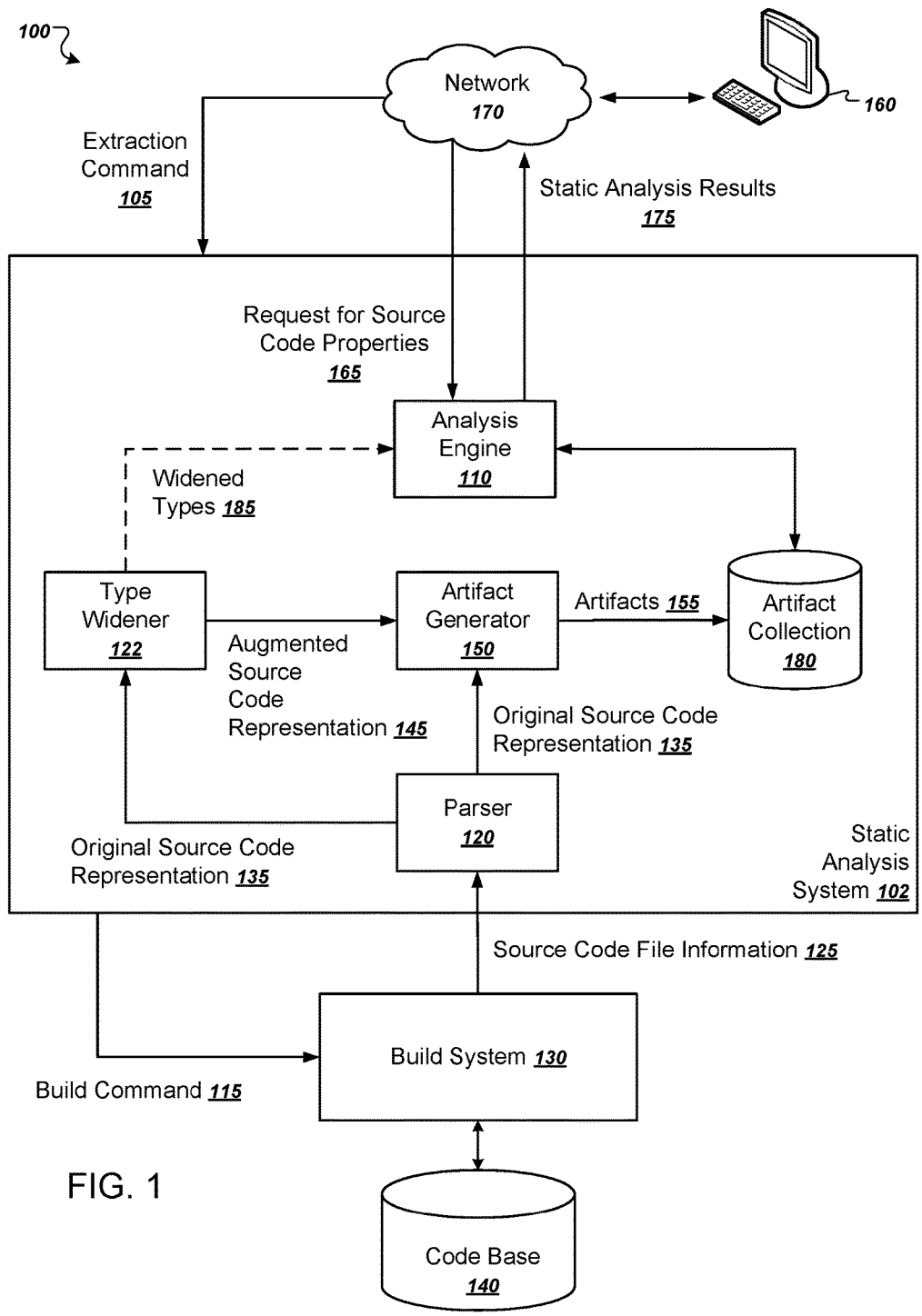
FIG. 1 is a diagram of an example system.

This specification describes how a static analysis system can generate widened types in order to improve static analysis results that are generated for source code in a code base. For each instance of an original type occurring in the source code, the system can generate a corresponding widened type according to one or more type widening procedures. The widened types often differ from the original types assigned by the program parser of a programming language.

Using widened types simplifies the implementation of static analyzers that analyze type information in source code. In this specification, a static analyzer is a functional module that determines whether particular source code elements have a particular property. Static analyzers that analyze how types are used in source code typically determine whether or not interacting source code elements have types that are compatible.

Static analyzers perform the following primary checks for type compatibility: (1) whether or not source code elements are comparable, e.g., when two variables are compared in source code, (2) whether or not one source code element is assignable to another, e.g., when one variable is assigned to another variable, and (3) whether or not a source code element is a valid parameter to a parameterized expression, e.g., in a method call that expects arguments having particular types. For example, a static analyzer can be implemented to determine whether two variables that are compared by a snippet of source code have comparable types. If they do not have comparable types, the static analyzer can record an indication that the snippet of source code is a coding violation and can generate a corresponding error message. Static analyzers may also perform other tests for type compatibility.

The checks for type compatibility that static analyzers perform is highly-language dependent. In addition, in many languages, whether or not types are compatible also depends on the kinds of types that are involved.

A type kind represents a class of types in a programming language that are all processed for type compatibility in the same or similar ways. For example, a programming language can consider floating point types and integer types to belong to the same type kind because the same or similar operations are performed to resolve compatibility checks between floating point types and integer types. For both of these types, the programming language can simply use the base types for floating point types and integer types to perform the compatibility checks. Thus, floating point types and integer types belong to the same type kind.

On the other hand, floating point types and type aliases typically belong to different type kinds. This means that the compiler or interpreter of such a programming language will process source code elements differently for floating point types than for type aliases. In particular, the type alias must be resolved first before the type compatibility check can be performed. In other words, the underlying type that is referenced by the type alias has to first be retrieved. This is not so for floating point types, for which the system can simply use the underlying type. Thus, floating point types and type aliases belong to different type kinds.

A static analyzer for type compatibility therefore performs different respective procedures for each type kind in order to determine how the programming language will process interactions between source code elements. The static analyzer will then designate particular interactions as coding defects if the interactions between the types violate coding standards or are otherwise somehow problematic.

An advantage of generating widened types is that doing so often maps types of multiple different type kinds to a single same type kind. Thus, by using widened types, a static analysis system can dramatically reduce the number of type kinds that need to be considered, and as a result, also can simplify the static analyzers that need to be implemented for a particular programming language. In addition, error messages that reference widened types instead of original types tend to be much more understandable for users of the static analysis system.

One example of a programming language with a sophisticated type system is Scala. The examples in this specification will refer to programming language constructs of Scala, but the same techniques can also be applied to other programming languages that have similarly sophisticated types. In Scala, for example, a system can use type widening to reduce the number of type kinds from 14 to 4. The specific widening procedures and reduction of type kinds are discussed in more detail below.

Each type in a programming language has a name that uniquely identifies the type and distinguishes it from other types. For example, the "Int" type is distinct from the "String" type, where "Int" and "String" are the respective type names. In Scala, each type name has an identifier, and optionally, a path. If a type has a path, the path represents the membership of the type according to defined packages or classes of the language implementation.

As a motivating example, consider the following example code snippet:

```
1  def main(args: Array[String]): Unit = {
2    val failures = (
3      for ((path, result) <- mainReflect(args).asScala ;
4        if ( result != TestState.Ok ) yield
5        path + ( if (result == TestState.Fail) " [FAILED]" else " [TIMEOUT]" )
6    )
7    // Re-list all failures to figure out what went wrong.
8    failures foreach System.err.println
9    if(!failures.isEmpty) sys.exit(1)
10 }
11
12 def mainReflect(args: Array[String]) : Array[String] = . . . // Omitted
```

The variables "path" and "result" receive values from the "mainReflect" function. In the example code segment, the body of the "mainReflect" function has been omitted for brevity.

In the underlined portions of this example on lines 4 and 5, "result !=TestState.Ok" and "result==TestState.Fail", the source code is performing a comparison between incompatible types. This comparison will not result in a compile error. However, the comparison will not behave as expected because the comparison is being performed between different types, which means that the program when executed is likely to never indicate that the values are the same. Therefore, a static analysis system can flag this code snippet as a type violation—a potential error requiring fixing, and report the violation with an appropriate message.

The "TestState.OK" variable and the "TestState.Fail" variables are both instances of an enumerated type having the type name "scala.tools.partest.TestState." In this example, the path of the type name is "scala.tools.partest," representing the membership of the type to a class, and the type identifier is "TestState."

However, when used in these comparisons, Scala considers the "result" variable to be a singleton type. A singleton type is a type that represents only the value stored by the variable. Thus, the "result" variable has a singleton type with the type name "NoPrefix#result". In other words, the type name has no path—only an identifier "result."

A singleton type belongs to a different type kind than an enumerated type. Thus, without type widening, in order to determine type compatibility, a static analysis system might need to implement many different analysis procedures to determine how the "result" variable interacts with the "TestState.OK" variable when the variables are compared.

In addition, the resulting error messages can be confusing to users. When a static analysis system identifies these comparisons as errors, the static analysis system can output an error message indicating that the comparison is between incompatible types. For example, a static analysis system might output the following error message: "Comparison between incomparable types NoPrefix#result and scala.tools.partest.TestState."

However, such an error message that adheres to the strict precision of the Scala type system may be confusing to users. For example, the name "NoPrefix#result" does not indicate what kind of information may be stored by the "result" variable. As a consequence, it may be difficult for a user to understand from this error message how the error can be fixed.

Thus, in many cases, a static analysis system can employ a type widener to generate widened types. The system can then augment the original types of a programming language with widened types, augment information about source code elements of a particular program with widened types, or both. The widened type may or may not correspond to a built-in type of the programming language.

In this example, the static analysis system can employ a type widener on the variable "result," which has a singleton type. To widen a singleton type, the system can generate a widened type corresponding to the type of the value represented by the singleton type. In this example, the singleton type represented a string value. Thus, the system can generate a widened type that corresponds to strings in the programming language and can associate the variable "result" with a widened type corresponding to strings.

For example, in Scala, the system can generate a widened type having the name "java.lang.String." In doing so, both variables in the comparison end up belonging to the same type kind rather than belonging to different type kinds. In particular, all singleton types in Scala can be widened to belong to a type kind that is used for methods. This simplifies the implementation of analyzers that inspect compatibility between different type kinds.

In addition, the resulting error message becomes much easier to understand, and how to correct the error also becomes more apparent to the user. For example, the original error message "Comparison between incomparable types NoPrefix#result and scala.tools.partest.TestState." now becomes "Comparison between incomparable types "java-lang.String" and "scala.tools.partest.TestState." From this error message, it is immediately apparent what the problem is, and potential solutions also become immediately apparent. For example, the developer can either write code that tests the "result" variable against a string type, or redefine the "result" variable to have the type "scala.tools.partest.TestState".

To further illustration how type widening simplifies the implementation of static analyzers, consider the following example code snippet:

1 val list:List[Int]=List(1,2,3,4)
2 val notAnInt: Boolean=true
3 println(list.contains(notAnInt))

The value notAnInt will never be a member of the given list, because notAnInt is a boolean value, and the list only holds integers. For technical reasons, the standard compilers for Scala and Java fail to find errors of this form.

To find this problem, a static analyzer finds the type held by the collection (Int) and the type held by the argument (Boolean), and checks if those two types are compatible. In this simple example, both types are simple type refs to classes, so the compatibility check is straightforward.

In the general case, however, both types might be any of the fourteen type kinds in Scala. Therefore, in order for the static analyzer to find this type of problem in general, each type will need to be checked against the fourteen type kinds, and different procedures for handling all fourteen type kinds need to be implemented.

Using type widening makes the implementation of the static analyzer much simpler. Only two type kinds need to be considered for this analyzer: a type ref to a class type, and refinement types. The version of the analyzer using widened types is thus much simpler, easier to maintain, easier to understand, and less error prone.

FIG. 1 is a diagram of an example system 100. The system 100 includes a user device 160 in communication with a static analysis system 102 over a network, 170, which can be any appropriate communications network. The system 100 is an example of a system in which a static analysis system 102 employs a type widener 122 to generate widened types from original types of a programming language.

The static analysis system includes an analysis engine 110, a type widener 122, a source code extractor 120, and an artifact generator that stores analysis artifacts in an artifact collection 180. The components of the static analysis system 102 can be implemented as computer programs installed on one or more computers in one or more locations that are coupled to each through a network. Alternatively, the static analysis system 102 can be installed in whole or in part on a single computing device, e.g., the user device 160.

The static analysis system 102 is in communication with a build system 130. The build system 130 can be installed on a single computer or on multiple computers. The static analysis system 102 and the build system 130 can be installed on different computing devices that are in communication with one another, e.g., using the network 170, or the static analysis system 102 and the build system 130 can be installed on a same computing device.

The build system 130 operates on source code in a code base 140. The build system 130 can include compilers that compile the source code, or the build system can be a system that does not compile source code. For example, the code base 140 can include interpreted languages such as Python or JavaScript that do not use a compiler at all.

In operation, the user device 160 provides an extraction command 105 to the static analysis system 102. The extraction command 105 is a request for the static analysis system 102 to extract source code that is processed by the build system 130. In some implementations, the static analysis system 102 causes the build system 130 to initiate a build of source code in the code base 140. For example, the static analysis system can provide a build command 115 to the build system 130 to initiate a build.

The build command 115 causes the static analysis system to receive intercepted source code file information 125 for source code processed by the build system 130. The source code file information 125 provides the static analysis system 102 with access to the source code processed by the build system. For example, the source code file information 125 can include the source code itself or a location, e.g., a file path, to a source code file. Suitable techniques for instrumenting build systems are described in more detail in U.S. Pat. No. 9,110,737, entitled "Extracting Source Code," and in U.S. application Ser. No. 14/947,631, entitled "Transparent Process Interception," both of which are herein incorporated by reference.

Regardless of the instrumentation technique used, the parser 120 receives the source code file information 125 in order to access precisely the source code that is processed by the build system 130. The parser 120 can be a standalone parser for a particular programming language, or the parser can be implemented as part of a compiler or an interpreter. The parser 120 uses the accessed source code to generate an original source code representation 135, which can be a compiled or interpreted representation of the source code, e.g., data representing a parse tree.

An artifact generator 150 receives the original source code representation 135 and generates one or more artifacts 155, which are stored in an artifact collection 180. An analysis artifact is a collection of data generated by a component of a static analysis system, as opposed to an object file or an executable generated by the build system 130. Analysis artifacts can be stored as files of a file system or stored in any appropriate data repository, e.g., as records in a database.

The analysis artifacts 155 generated by a static analysis system typically include various properties of the source code in the source code files, e.g., information that describes relationships between source code constructs in the source code, e.g., between types, variables, functions, and classes. For example, the analysis artifacts 155 can include an original type for the source code constructs as output by the parser.

The static analysis system can generate widened types for one or more of the original types and/or one or more source code elements occurring in the original source code representation 135 as output by the parser. The system can generate the widened types either before or during a request for source code properties 165 is received.

To generate the widened types before the request 165 is received, the parser 120 can provide the original source code representation 135, which includes data representing source code elements and their original types, to a type widener 122. The type widener receives the original source code representation 135 and generates an augmented source code representation 145. The augmented source code representation 145 associates source code elements occurring in the original source code representation 135 with a widened type. For example, if the original source code representation 135 is a parse tree, the system can associate one or more parse nodes of the parse tree with widened types for the corresponding source code elements.

There may be certain advantages to generating the widened types before the request 165 is received. In particular, the system can generate the widened types while having full access to the original source code representation 135 generated by the parser 120. Having such access provides the system 102 with context information for the source code elements, which can result in an unambiguous widened type for each source code element with an original type and which can therefore result in greater precision. If the system generates widened types later, the system may not have access to the original source code representation 135 generated by the parser 120, which can result in more than one widened type being possible for each source code element with an original type.

The system can generate such widened types for all or a subset of the original types that occur in the original source code representation 135. The type widener can widen types according to type-specific and instance-specific widening procedures that are described in more detail below.

The type widener 122 then provides the augmented source code representation 145 to the artifact generator 150. The artifact generator 150 then generates artifacts 155 that associate the source code elements with their corresponding widened types.

To provide static analysis results, the system 102 receives, from the user device 160, a request for source code properties 165 of a portion of the code base 140.

An analysis engine 110 receives the request 165 and uses one or more static analyzers to analyze data stored in the artifact collection 180 in order to generate static analysis results 175. In particular, the analysis engine 110 can use static analyzers that operate on widened types associated with source code elements rather than on the original types. Each static analyzer can be implemented as a separate computer program or function. In some implementations, each analyzer is implemented as a query that operates on the artifact collection 180.

The analysis engine 110 then provides the static analysis results 175 back to the user device 160, where the user device 160 presents the results 175 to a user. For example, the static analysis results can be presented as part of an integrated development environment (IDE) or in a command line environment. The static analysis results 175 can identify type violations in the source code files of the code base 140, e.g., where in the code base the violation occurs, as well as an error message explaining why the snippet of code is considered to be a violation.

When using type widening, the analysis engine 110 will typically generate error messages that refer to widened types instead of original types where possible. Alternatively, the analysis engine 110 can present error messages that refer to both the widened types and the original types.

If the types were widened before the request 165 was received, the analysis engine 110 can access the widened types from the artifact collection 180 while generating the static analysis results 175.

Alternatively, the analysis engine 110 can request widened types 185 from the type widener 122 while generating the static analysis results 175. For example, when the analysis engine 110 receives an indication of a type violation that should be reported in the static analysis results 175, the analysis engine 110 can provide original type information to the type widener 122 and receive widened types 185 in response.

Figure 2:
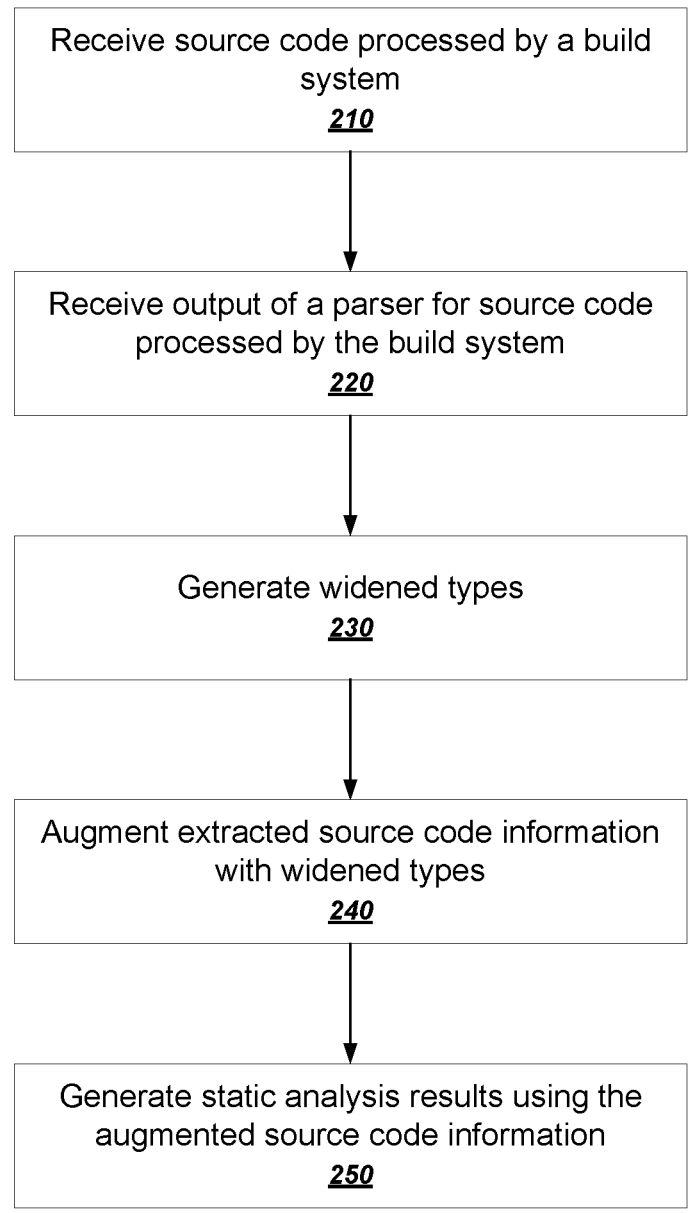
FIG. 2 is a flow chart of an example process for generating widened types.

FIG. 2 is a flow chart of an example process for generating widened types. The process will be described as being performed by an appropriately programmed system of one or more computers, e.g., the static analysis system 102 of FIG. 1.

The system receives source code processed by a build system (210). For example, the system can initiate a build on a build system in order to extract source code from the build system. The system can then use a parser for a programming language to parse the received source code.

The system receives output of a parser for source code processed by the build system (220). The system can process the extracted source code with a parser, compiler, or interpreter to obtain information about the source code, e.g., a representation of parse trees that result from parsing as well as type checking information. This information includes precise type information of the programming language of the source code being built.

In the output of the parser, each instance of a source code element having an identifiable type will be associated with an identifier for the source code element as well as type information for the source code element. For example, if the output is a parse tree that includes a node representing a variable, the node will be associated with an identifier for the variable as well as type information for the variable.

The type information will depend on the programming language. In Scala, there are 14 different type kinds, including simple named types, e.g., java.lang.String, parametric types, e.g., java.util.List[java.lang.String], and several others. The available types in the case of Scala are enumerated in detail below.

The system generates widened types (230). The system can generate a widened type for each source code element that occurs in the output of the parser. However, the system need not generate a widened type for every source code element. In some implementations, the system maintains a subset of the original types for which widened types should be generated.

Each widened type is generated from an original type in a way that is typically specific to the original type and also specific to the instance of the original type in the source code. For example, the system generates widened types for singleton types in a different way than for method types. In addition, the system generates widened types for singleton types of integer variables in a different way than for singleton types of string variables. Thus, the system can maintain specific type widening procedures for each original type.

Often the process of generating a widened type maps an original type from one type kind of the programming language to another. For example, a singleton type in Scala belongs to the singleton type kind, but the widened type belongs to the type ref type kind.

Specific techniques for generating widened types from original types will be described in more detail below.

The process of generating a widened type may take multiple iterations. Some original types may get widened into other types that themselves need to be widened further. For example, widening a singleton type results in a new type corresponding to the variable associated with the singleton type instance, and the new type itself may be a type that requires further widening. This process is described in more detail below with reference to FIG. 3.

The system augments the extracted source code information with widened types (240). When generating widened types, the system can associate each source code element with a widened type, with a widened type name, or both. For example, the generated widened type may correspond to an actual built-in or user-defined type of the programming language, and the system can associate the source code element with the widened type. The system may also associate the instance of the source code element with a widened type name. Or the system can do both. For brevity, in this specification associating a widened type with an instance of a source code element having an original type can mean associating a programming language type, a name of a programming language type, or both, with an instance of the source code element, which meaning will be clear from the context in which it is used.

The system can augment the extracted source code information with widened types either before or while generating static analysis results. For example, the system can generate the widened types before generating the results by generating the widened types at build time or extraction time. The system can then store a representation of the association between source code elements and their corresponding widened types. In some implementations, the system generates a database having properties of all source code elements in the code base. The system can then augment each instance of a source code element with the associated widened type if such a widened type is available.

Alternatively or in addition, the system can augment the source code information while generating static analysis results. In other words, when generating status analysis results, the system can generate a widened type for instances of source code elements.

In some implementations, generating widened types results in a reduced set of type kinds. In other words, for some type kinds, all types that belong to an original type kind belong to a different, preexisting type kind after being widened. For example, in Scala, singleton types can belong to the method type kind instead of the singleton type kind after widening. This effectively reduces the set of type kinds by removing the singleton type kind.

The system generates static analysis results using the source code information augmented with widened types (250). As described above, the system can execute analyzers that operate on the widened types instead of or in addition to analyzers that operate on original types. In many cases, operating only on the widened types simplifies the analyzers that the system needs to implement and execute. In other words, instead of having two different sets of analyzers for source code elements belonging to different types kinds, widening the types can move types from one of the two kinds to the other of the two kinds, and the system can simply use analyzers for the other of the two kinds instead of both.

The static analysis results generally refer to the source code elements according to the widened type name instead of the original type name. In other words, when an instance of a source code element having an original type is referenced in the static analysis results, the system uses the name of the associated widened type instead of a name for the original type.

The static analysis results can be presented in any appropriate user interface, e.g., within a panel of an IDE plug-in. In some implementations, the system presents both the original type name and the widened type name. Or the system can present user interface controls that allow a user to switch back and forth between original type names and widened type names, or the system can present both simultaneously.

Figure 3:
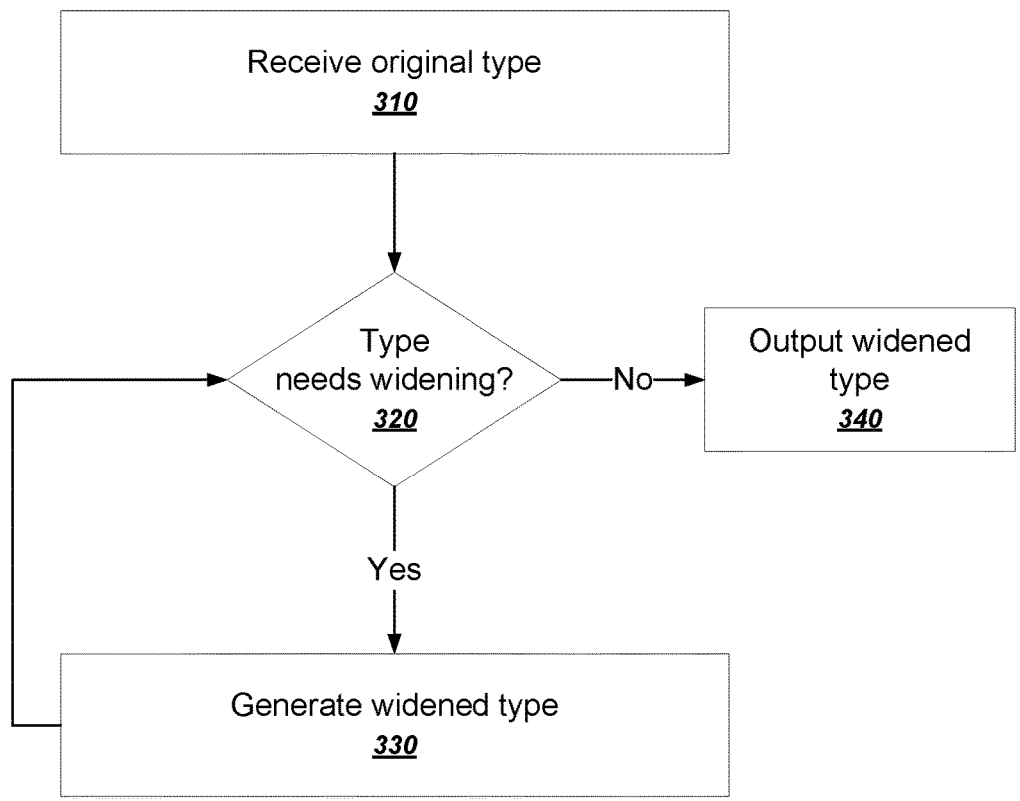
FIG. 3 is a flow chart of an example process for generating a widened type.

FIG. 3 is a flow chart of an example process for generating a widened type. A static analysis system can recursively widen types until the output type is no longer a type that needs to be widened. The process will be described as being performed by an appropriately programmed system of one or more computers, e.g., the type widener 122 of FIG. 1.

The system receives an original type (310). For example, the system can iterate over all instances of source code elements represented in the output of a parser for a particular source code file.

The system determines whether an instance of an original type should be widened (312). To do so, the system can maintain a set of types that should be widened.

For example, in some implementations the system widens singleton types but does not widen parametric types. The treatment of these types is described in more detail below.

If the instance of the original type should be widened, the system generates a widened type (branch to 330). The system generally performs an instance and type-specific procedure to produce an output that identifies a widened type.

The system then determines whether the output of the process needs to be widened (branch to 320). In many cases, the widened type itself corresponds to an original type that needs to be widened. Thus, the system iteratively determines whether the output type needs to be widened (loop from 320 to 330).

If the type should not be widened, the system outputs the final widened type (branch to 340).

Specific techniques for generating widened types from original types will now be described in more detail for each of multiple different type kinds in Scala.

Figure 4:
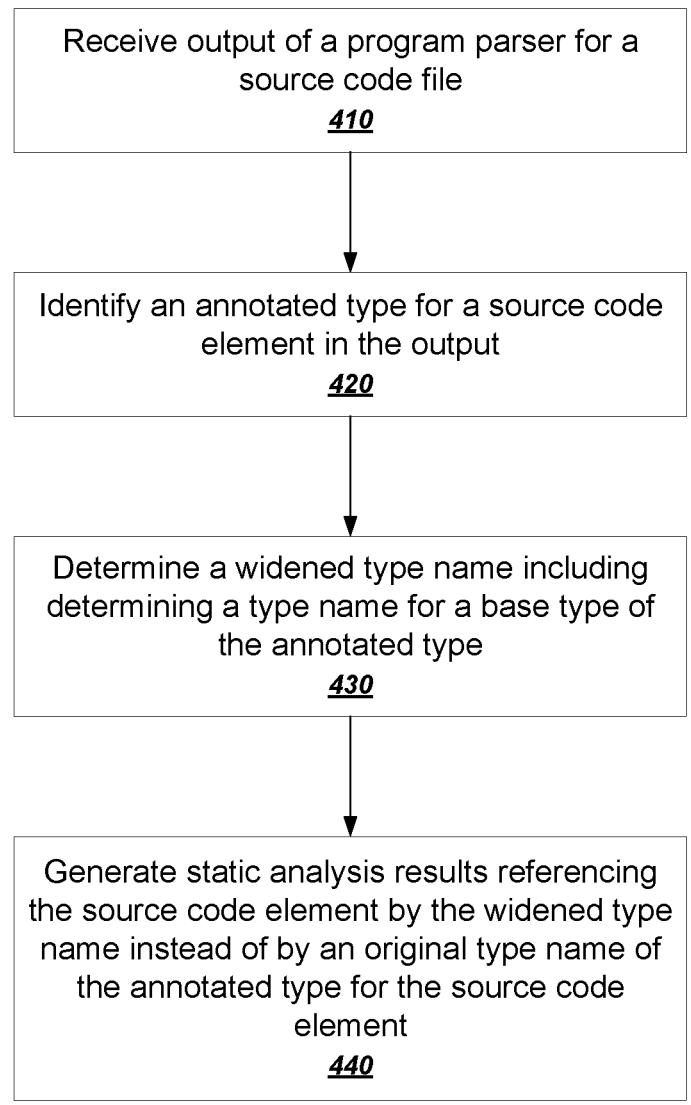
FIG. 4 is a flow chart of an example process for generating widened types for annotated types.

FIG. 4 is a flow chart of an example process for generating widened types for annotated types. The process will be described as being performed by an appropriately programmed system of one or more computers, e.g., the static analysis system 102 of FIG. 1.

An annotated type is a type that adds an annotation to a base type. In other words, the type name of the annotated type is metadata for the base type. For example, the following example code adds an annotation "@suspendable" to the type String.

String @suspendable

Static analysis results that reference annotated types may be confusing to users because it may be unclear how user-specified metadata associated with the base type is affecting the compilation or what should be changed to fix the defect. In many cases, the user-specified metadata actually has no effect on the compilation, and instead, it's the base type that matters. Thus, a static analysis system can widen annotated types.

The system receives the output of a program parser for the source code file (410).

The system identifies an annotated type for a source code element in the output (420).

The system determines a widened type name including determining a type name for a base type of the annotated type (430). To do so, the system can determine the base type associated with the annotated type and return the associated base type. For example, in the output of the parser, an instance of an annotated type will be associated with an identifier for the base type. The system can identify the base type identifier and return the base type as the widened type. And, as described above, the base type may itself need further widening.

Widening annotated types can also result in all annotated types being widened to belong to the method type kind. Thus, the system can eliminate the annotated type kind, thereby reducing the number of type kinds to be analyzed.

The system generates static analysis results referencing the source code element by the widened type name instead of by an original type name of the annotated type for the source code element (440).

Figure 5:
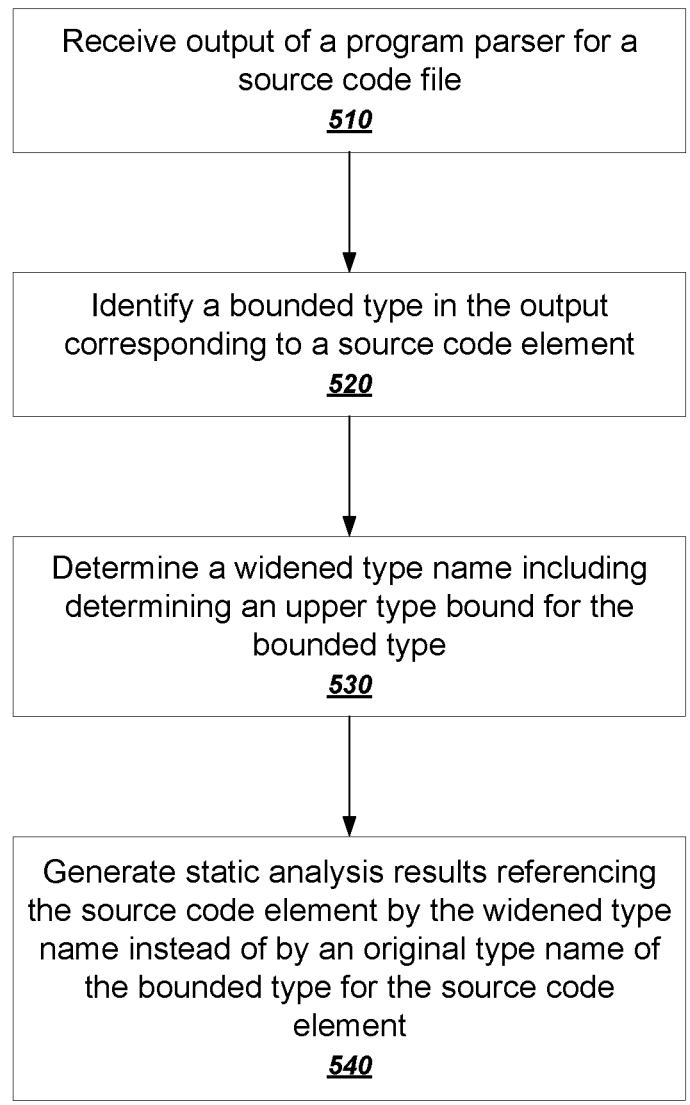
FIG. 5 is a flow chart of an example process for generating widened types for bounded types.

FIG. 5 is a flow chart of an example process for generating widened types for bounded types. The process will be described as being performed by an appropriately programmed system of one or more computers, e.g., the static analysis system 102 of FIG. 1.

A bounded type is a type in which a base type is constrained to an upper or lower type bound. An upper type bound means that the bounded base type must be a subclass of the upper type bound. Conversely, a lower type bound means that the bounded based type must be a superclass of the lower type bound. In the case of a type with a lower type bound, with no explicit upper bound specified, there is an implicit upper bound. For example, the upper bound can be the root of a class hierarchy that all other classes inherit from. In Scala, the implicit upper bound is the type "Any".

In Scala, for example, type parameters and abstract types can appear as bounded types. For example, the following example code illustrates an upper bound on a base type T. In other words, the base type T must be a subclass of a sequence of type U:

type T<: Seq[U]

In other words, if something other than a subclass of a sequence of type U is assigned for the bounded type, the compiler will return a type error.

When referenced by static analysis results, bounded types can be confusing, particularly when the relationship between the bounded type and the upper or lower bound is unclear. Thus, a static analysis system can widen bounded types.

The system receives the output of a program parser for the source code file (510).

The system identifies a bounded type for a source code element in the output (520).

The system determines a widened type name including determining an upper type bound for the bounded type (530). In other words, the system can return the upper type for both upper bounded types as well as for lower bounded types. That is, if the base type is bounded by an upper type bound, the system returns the upper type bound. If the base type is bounded by only a lower type bound, the system still returns the implicit upper bound "Any".

Widening bounded types can also result in all bounded types being widened to belong to the method type kind. Thus, the system can eliminate the bounded type kind, thereby reducing the number of type kinds to be analyzed.

The system generates static analysis results referencing the source code element by the widened type name instead of by an original type name of the bounded type for the source code element (540).

Figure 6:
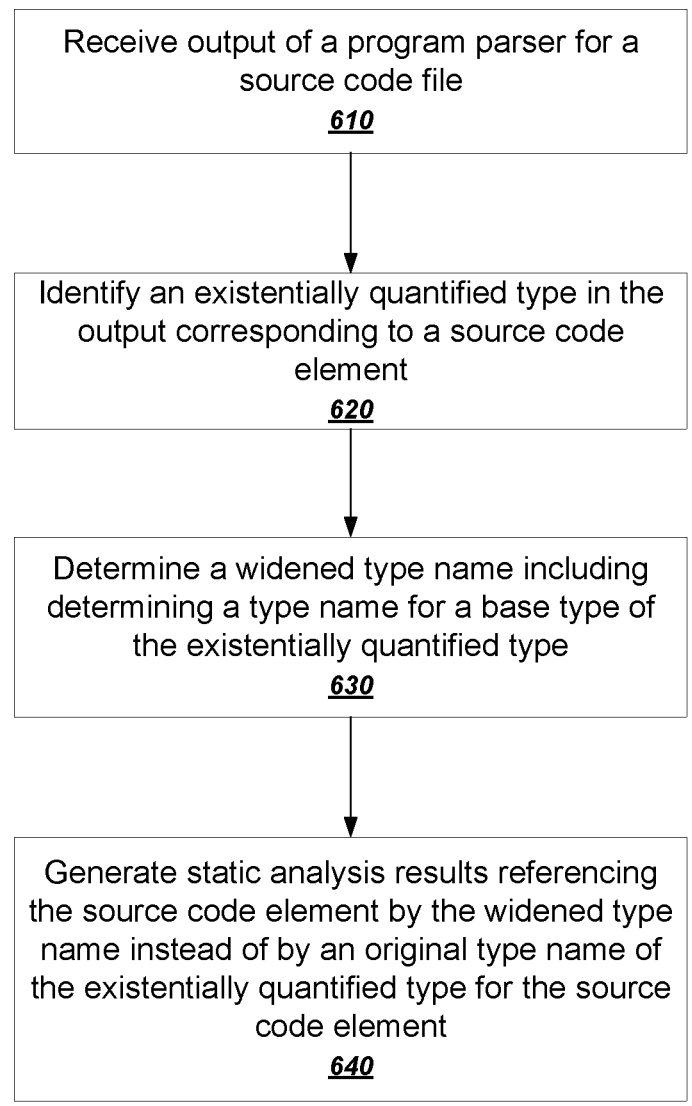
FIG. 6 is a flow chart of an example process for generating widened types for existentially quantified types.

FIG. 6 is a flow chart of an example process for generating widened types for existentially quantified types. The process will be described as being performed by an appropriately programmed system of one or more computers, e.g., the static analysis system 102 of FIG. 1.

An existentially quantified type defines a type that when instantiated will use one or more other types that are not explicitly specified in the type definition. Some properties of the other types may nevertheless be specified, e.g., a subclass or superclass of the to-be specified type. For example, the following example code defines an abstract method "existential" that returns an existentially quantified type.

def existential: (T, T) forSome {type T<: Number}

When referenced by static analysis results, existentially quantified types can be confusing because the symbols by which the type is quantified, e.g., in this case "type T<: Number," often do not matter for type errors that the system generates.

For example, a type error involving the example code above may generate an error message about the type named "Tuple2[T,T] forSome {type T<: Number}", which can be confusing for users to understand.

The system receives the output of a program parser for the source code file (610).

The system identifies an existentially quantified type for a source code element in the output (620).

The system determines a widened type name including determining a type name for a base type of the existentially quantified type (630). In other words, a static analysis system can widen existentially quantified types by determining the base type of the existentially quantified type and returning the base type. In the example above, the system can return "Tuple2[T,T]" as the widened type.

Widening existentially quantified types can also result in all existentially quantified types being widened to belong to the method type kind. Thus, the system can eliminate the existentially quantified type kind, thereby reducing the number of type kinds to be analyzed.

The system generates static analysis results referencing the source code element by the widened type name instead of by an original type name of the existentially quantified type for the source code element (640).

Figure 7:
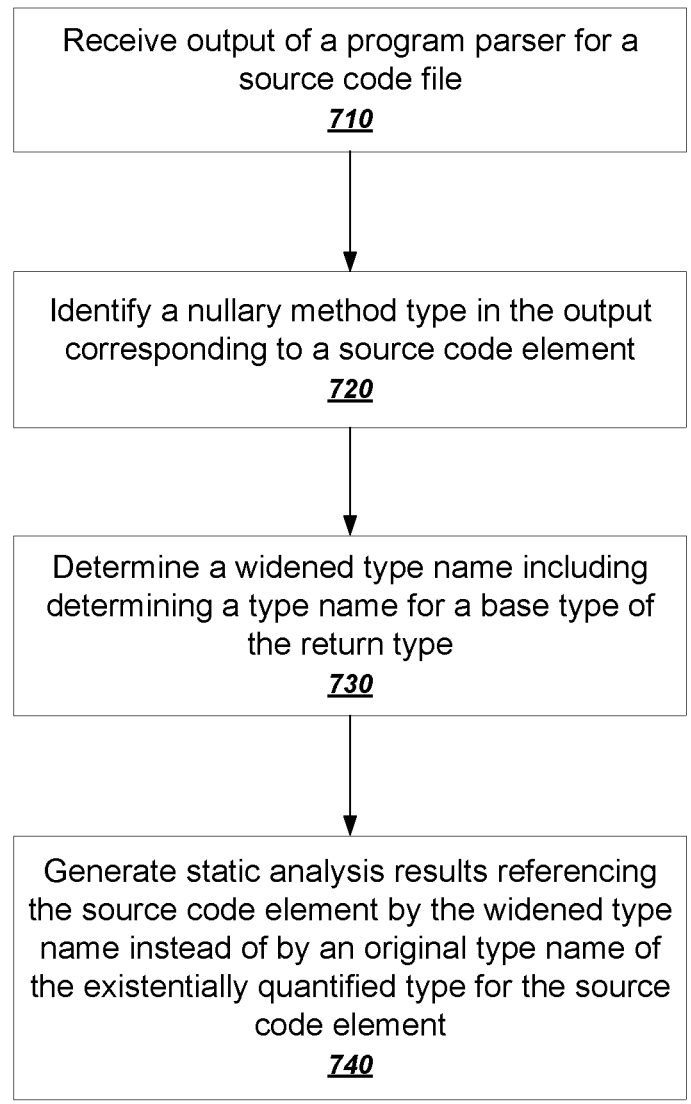
FIG. 7 is a flow chart of an example process for generating widened types for nullary methods.

FIG. 7 is a flow chart of an example process for generating widened types for nullary methods. The process will be described as being performed by an appropriately programmed system of one or more computers, e.g., the static analysis system 102 of FIG. 1.

Nullary methods are methods that take no arguments and return a value. In languages that have nullary methods, the nullary methods are often used interchangeably with variables. For example, in the statement "radius+5", the identifier "radius" might refer to a variable or it might refer to a nullary method. Methods having arguments generally do not introduce the same ambiguity.

The type of a nullary method is different from the base type of the value returned by the method. For example, in Scala, the following example code defines an abstract nullary method that returns an integer represented by the "Int" type name:

def anInt: Int

The return type of this method has the type name "=>Int," which is treated differently from the base type "Int." However, this difference rarely matters for static analysis results. Therefore, a static analysis system can widen the return type of a nullary method to be the base type of the return type.

The system receives the output of a program parser for the source code file (710).

The system identifies a bounded type for a source code element in the output (720).

The system determines a widened type name including determining a type name for a base type of the return type (730). Widening nullary method types can also result in all nullary method types being widened to belong to the method type kind. Thus, the system can eliminate the nullary method type kind, thereby reducing the number of type kinds to be analyzed. For non-nullary methods, e.g., methods that take arguments, the system can bypass widening the return type.

The system generates static analysis results referencing the source code element by the widened type name instead of by an original type name of the nullary method type for the source code element (740).

Figure 8:
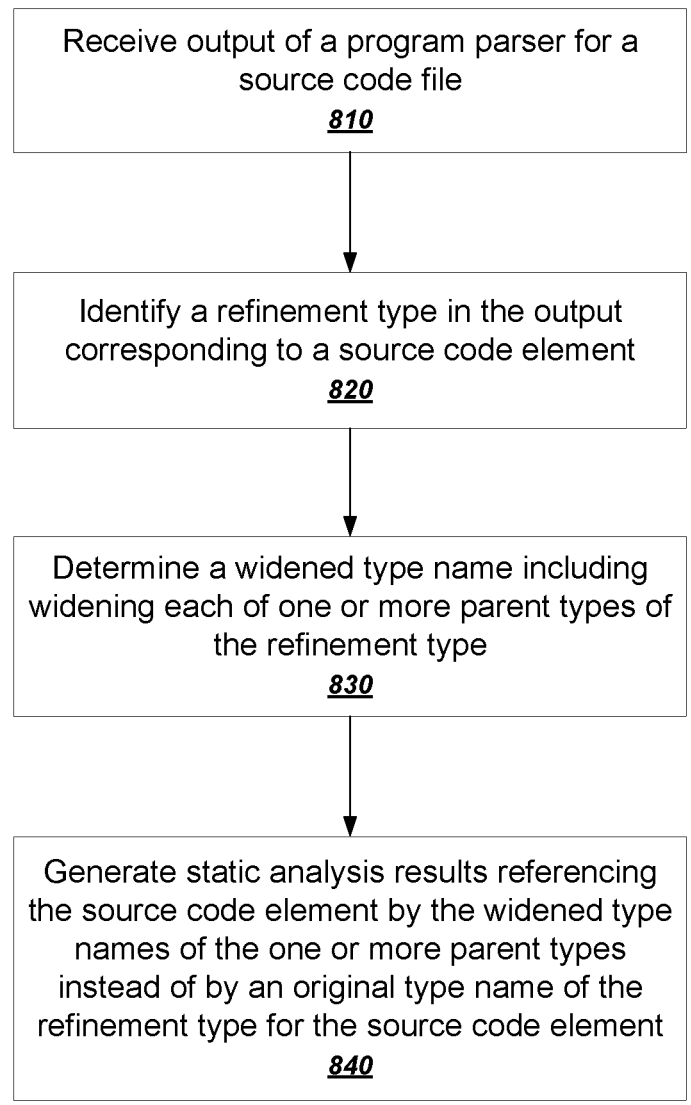
FIG. 8 is a flow chart of an example process for generating widened types for refinement types.

FIG. 8 is a flow chart of an example process for generating widened types for refinement types. The process will be described as being performed by an appropriately programmed system of one or more computers, e.g., the static analysis system 102 of FIG. 1.

A refinement type is a type that augments the intersection of one or more other types, which are referred to as parent types, with one or more declarations. For example, the following source code defines two types. One of them, S, is a simple type variable that is bounded by the type Serializable. The second one, T, is bounded by a refinement type. The refinement type in this case refines the intersection of the types S and EventListener to also have a method "open".

type S<: Serializable type T<: S with EventListener {def open( ):Int}

Refinement types are difficult to safely simplify, because any of their components might be interesting to static analysis. In the above example, the "S", "EventListener", and "open" parts are all aspects of the type that might be interesting to a static analysis routine.

What a type widener can do, though, is widen the parent types of the refinement. In this example, the "S" is widened to "Serializable", and the "EventListener" part is left alone. Thus, the widened type of T in the above example is:

Serializable with EventListener {def open( ): Int}

The system receives the output of a program parser for the source code file (810).

The system identifies a refinement type for a source code element in the output (820).

The system determines a widened type name including widening each of one or more parent types of the refinement type (830).

The system generates static analysis results referencing the source code element by the widened type name instead of by an original type name of the refinement type for the source code element (840).

In this example, the widened type is modified from the original type. However, the widened type still belongs to its own type kind for refined types. In other words, it is possible and even common in some cases to generate widened type that is not mapped to a different type kind.

In some cases, the system may even decline to widen types at all. One such example includes universally quantified types. Consider the following Scala method that has a type parameter:

def evens[T](nums: List[T]): List[T]= if (nums.isEmpty) nums else odds(nums.tail)

The type of evens is a universally quantified type "[T](List[T])List[T]". This type has a type parameter scoped over the whole type: the [T] represents this type parameter. In this case, the type being parameterized is a method type. For any choice of T, there is a method type mapping lists of that T to lists of that same T. For example, a caller might choose Int as the value of T for a given call to the method. In that case, the caller would need to supply a List[Int] as an argument. The method would also return a List[Int].

In Scala, these universally quantified types only occur as the types of methods. In a call to the method, the type parameters will already be resolved, so there won't be a universally quantified type to look at any longer. A static analyzer will only see a type of this form when specifically analyzing methods, so they will be prepared to take apart the components of the type explicitly. In fact, such queries are often specifically designed to look at these parameters, including the universally quantified type parameters.

Therefore, in some implementations, a static analysis system does not widen universally quantified types. Rather, the system leaves the universally quantified types as belonging to their own type kind having their own associated procedures.

To continue the example, a call to this method might look as follows:

val myNumbers: List[Int]=List(1, 1, 2, 3, 5, 8)

val myEvens: List[Int]=evens[Int](myNumbers)

In common usage, a programmer might write "evens (myNumbers)" and let the compiler insert the "[Int]", but it is conceptually present even if the programmer doesn't write it.

In this call, the type of "evens" will be a poly type. The type of "evens[Int]" will be a method type (List[Int]) List [Int]. The type of the whole call will be List[Int].

Figure 9:
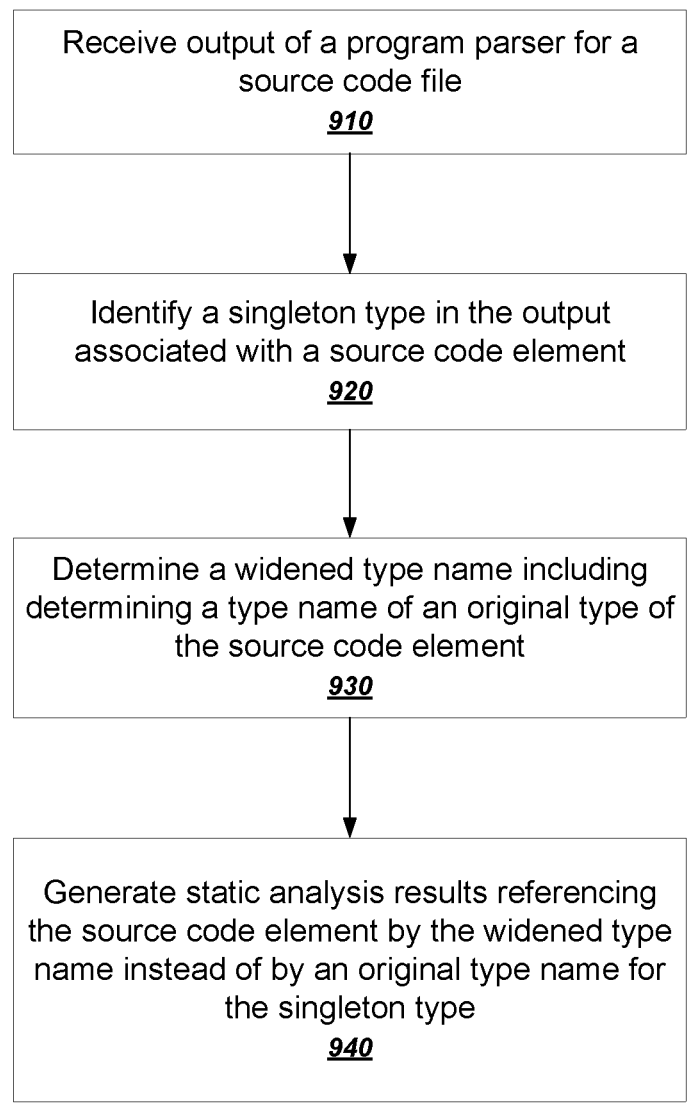
FIG. 9 is a flow chart of an example process for generating widened types for singleton types.

FIG. 9 is a flow chart of an example process for generating widened types for singleton types. The process will be described as being performed by an appropriately programmed system of one or more computers, e.g., the static analysis system 102 of FIG. 1.

The system receives the output of a program parser for the source code file (910).

The system identifies a singleton type associated with a source code element in the output (920). As discussed above, singleton types are types that represent only the value stored by a particular source code element.

The system determines a widened type name including determining a type name of an original type of the source code element (930). To widen a singleton type, the system can generate a widened type corresponding to the type of the value represented by the singleton type. For example, if a singleton type represents a string value, the system can generate a widened type that corresponds to strings in the programming language.

Widening singleton types can also result in all singleton types being widened to belong to the method type kind. Thus, the system can eliminate the singleton type kind, thereby reducing the number of type kinds to be analyzed.

The system generates static analysis results referencing the source code element by the widened type name instead of by an original type name for the singleton type (940).

Figure 10:
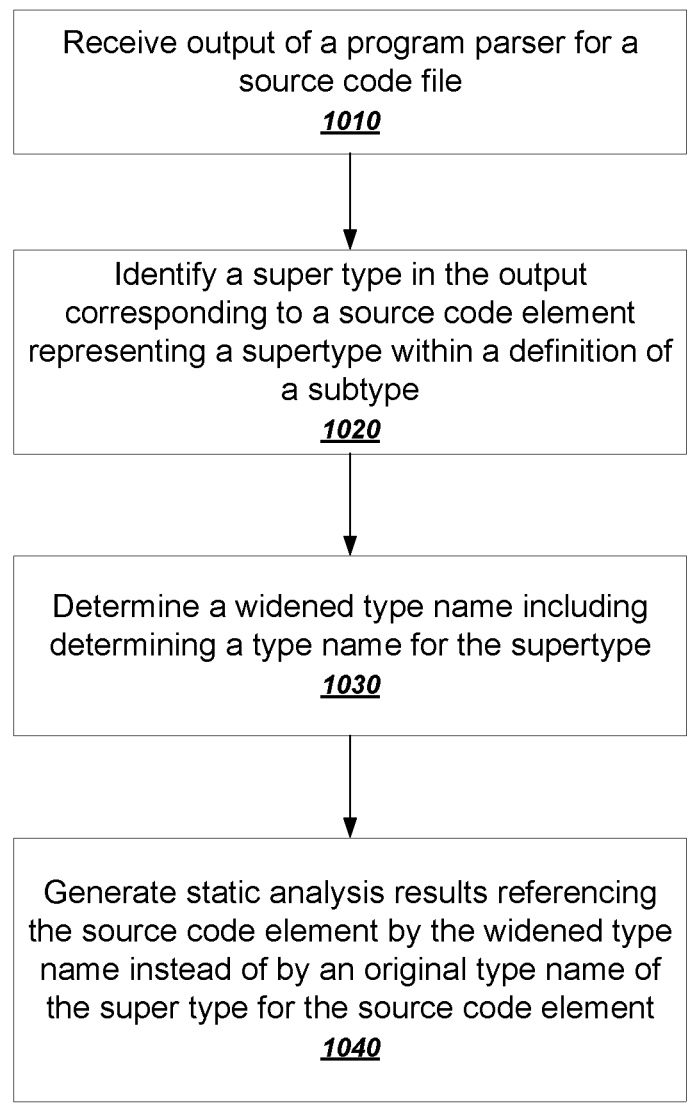
FIG. 10 is a flow chart of an example process for generating widened types for super types.

FIG. 10 is a flow chart of an example process for generating widened types for super types. The process will be described as being performed by an appropriately programmed system of one or more computers, e.g., the static analysis system 102 of FIG. 1.

A "super" type is a type that represents a supertype within a definition of a subtype. For example, a method can use a super type in a method in order to invoke another method that it overrides. For example, consider the following source code:

```
01  class CountingStringBuilder extends StringBuilder {
02    override def close ( ) : Unit = {
03      super.close ( )
04      finishCount ( )
05    }
06    // other definitions omitted
07  }
```

In this example, the type of the keyword "super" in "super. close( )" is a super type, which represents the supertype "StringBuilder". In other words, "super.close( )" invokes the "close( )" method as defined in the StringBuilder supertype.

The system receives the output of a program parser for the source code file (1010).

The system identifies a super type corresponding to a source code element in the output representing a supertype within a definition of a subtype (1020).

The system determines a widened type name including determining a type name for the supertype (1030). Type widening of a super type replaces the super type by the widened type that the super type represents. In this example, the widened type would be "StringBuilder."

Widening super types can also result in all super types being widened to belong to the method type kind. Thus, the system can eliminate the super type kind, thereby reducing the number of type kinds to be analyzed.

The system generates static analysis results referencing the source code element by the widened type name instead of by an original type name of the super type for the source code element (1040).

Figure 11:
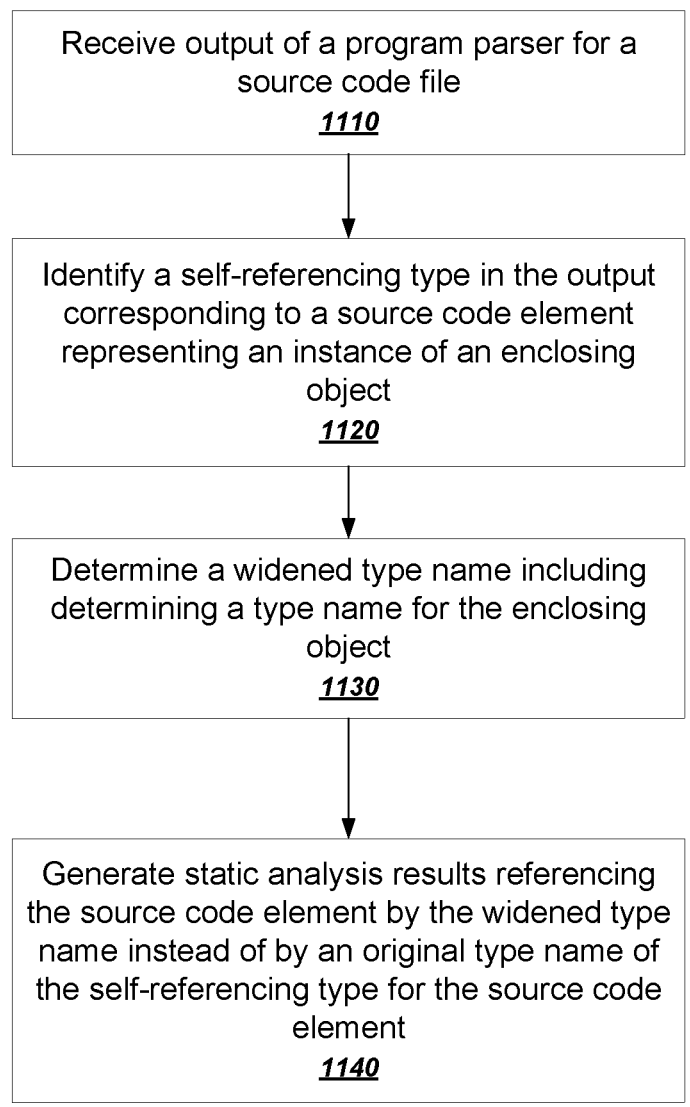
FIG. 11 is a flow chart of an example process for generating widened types for self-referencing types.

FIG. 11 is a flow chart of an example process for generating widened types for self-referencing types. The process will be described as being performed by an appropriately programmed system of one or more computers, e.g., the static analysis system 102 of FIG. 1.

Many programming languages provide the ability for a statement to use a self-type operator to obtain a self type— that is, the type of the object enclosing the statement. The self-type operator is commonly named "this." In Scala, for example, the type of the enclosing object can be obtained by invoking the method "this.type."

The result of this operation is a singleton type that refers only to the distinct instance of the object. For example, the following code in Scala uses the "this.type" method:

```
trait Test {
  def myself: this.type
}
```

This example code defines a new type named "myself" that is based on the type of the enclosing object using the operator "this.type". When using "this.type," the result is a singleton type for the enclosing object.

When referenced in static analysis results, the details of this singleton type are usually not helpful.

The system receives the output of a program parser for the source code file (1110).

The system identifies a self-referencing type corresponding to a source code element in the output representing an instance of an enclosing object (1120).

The system determines a widened type name including determining a type name for the enclosing object (1130). In other words, a static analysis system can widen self-referencing types by generating a widened type corresponding to the type of the enclosing object. In this example, the widened type would be the type "Test."

Widening self-referencing types can also result in all self-referencing types being widened to belong to the method type kind. Thus, the system can eliminate the self-referencing type kind, thereby reducing the number of type kinds to be analyzed.

The system generates static analysis results referencing the source code element by the widened type name instead of by an original type name of the self-referencing type for the source code element (1140).

Figure 12A:
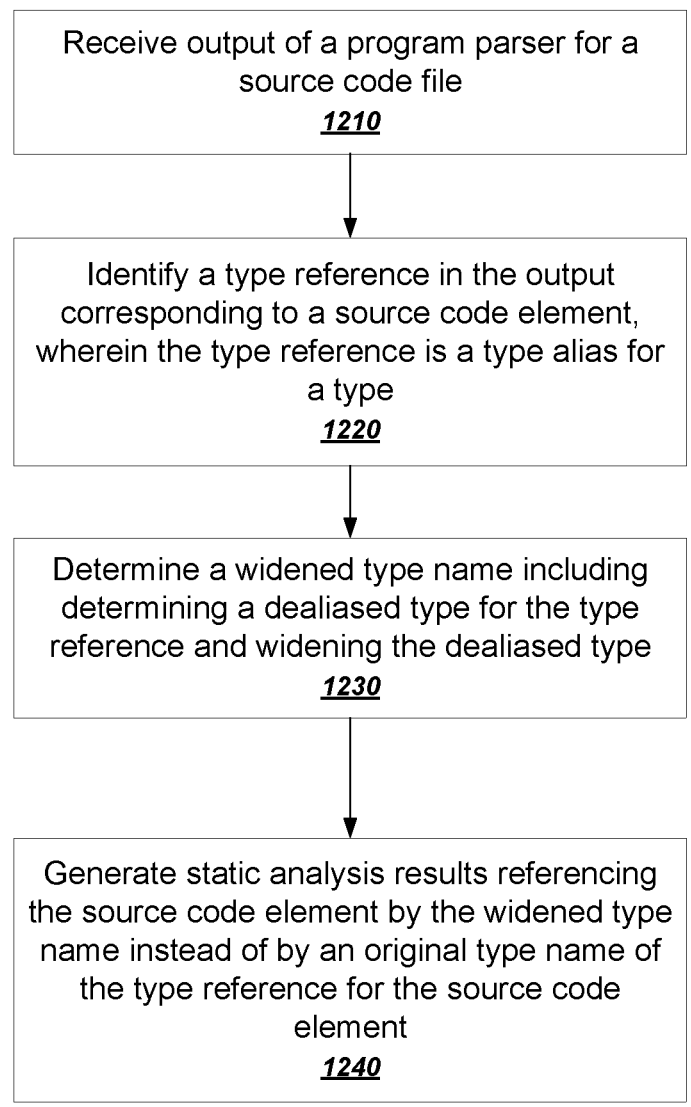
FIGS. 12A-B are flow charts of example processes for generating widened types for type references.
Figure 12B:
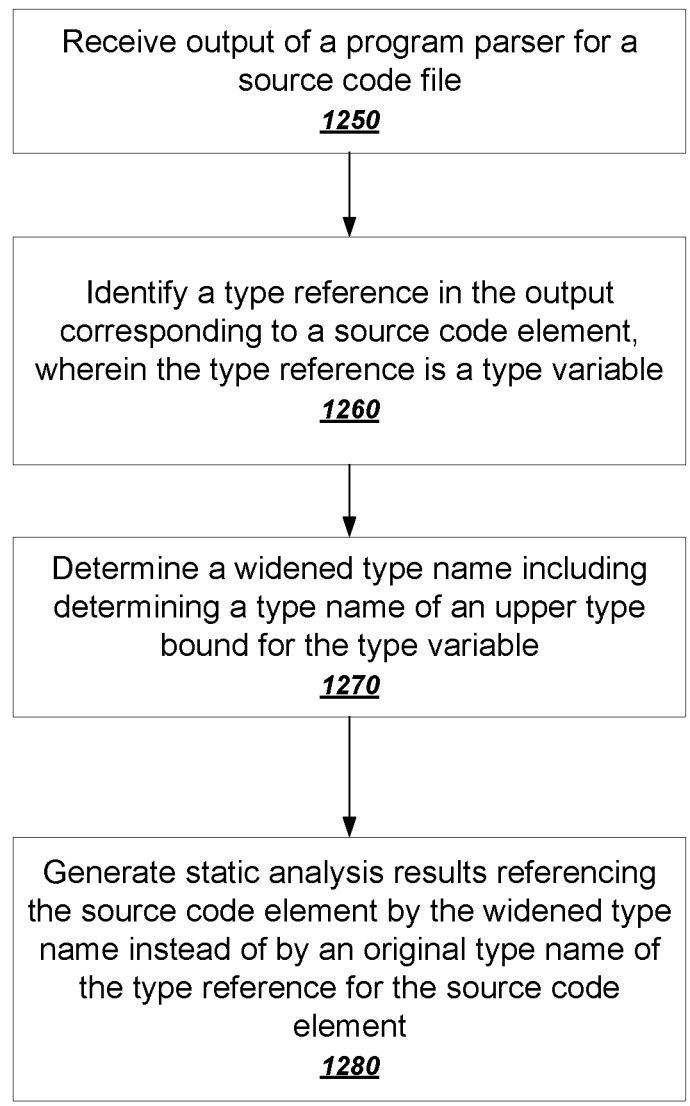

FIGS. 12A-B are flow charts of example processes for generating widened types for type references. A type reference is a reference to a type by name, along with an optional prefix and list of arguments. The following example Scala code includes several different type references.

```
abstract class Test[W<: Widget]{
  type IntAlias=Int
  def intViaAlias: IntAlias
  def widget: W
}
```

In the above example, "Int" is a type reference to the built-in integer type. "IntAlias" is a type variable that is an exact alias of "Int". "W" is a type variable that is unknown locally, but it is declared to have an upper bound of Widget. The return type of "intViaAlias" is a type reference to "IntAlias", and the return type of "widget" is a type reference to "W".

User defined-aliases can be confusing in static analysis results because the nature of the underlying type may be unclear to users.

The system can treat type references differently depending on whether the type reference is an alias for a type or an alias for a type variable.

FIG. 12A illustrates generating widened types for an alias for a type. The process will be described as being performed by an appropriately programmed system of one or more computers, e.g., the static analysis system 102 of FIG. 1.

The system receives the output of a program parser for the source code file (1210).

The system identifies a type reference corresponding to a source code element in the output, wherein the type reference is a type alias for a type (1220).

The system determines a widened type name including determining a dealiased type for the type reference and widening the dealiased type (1230). In other words, if the type reference is an alias for a type, the system can dealias the type reference and widen the resulting dealiased type, if necessary. In this example, a reference to IntAlias is widened to be a reference to Int.

The system generates static analysis results referencing the source code element by the widened type name instead of by an original type name of the type reference for the source code element (1240).

FIG. 12B illustrates generating widened types for a type variable. The process will be described as being performed by an appropriately programmed system of one or more computers, e.g., the static analysis system 102 of FIG. 1.

The system receives the output of a program parser for the source code file (1250).

The system identifies a type reference corresponding to a source code element in the output, wherein the type reference is a type variable (1260).

The system determines a widened type name including determining a type name of an upper type bound for the type variable (1270). In other words, if the type reference is an alias for a type variable, the system can return the upper type bound for the type variable. In this example, a reference to W is widened to a reference to Widget.

The system generates static analysis results referencing the source code element by the widened type name instead of by an original type name of the type reference for the source code element (1280).

Figure 13:
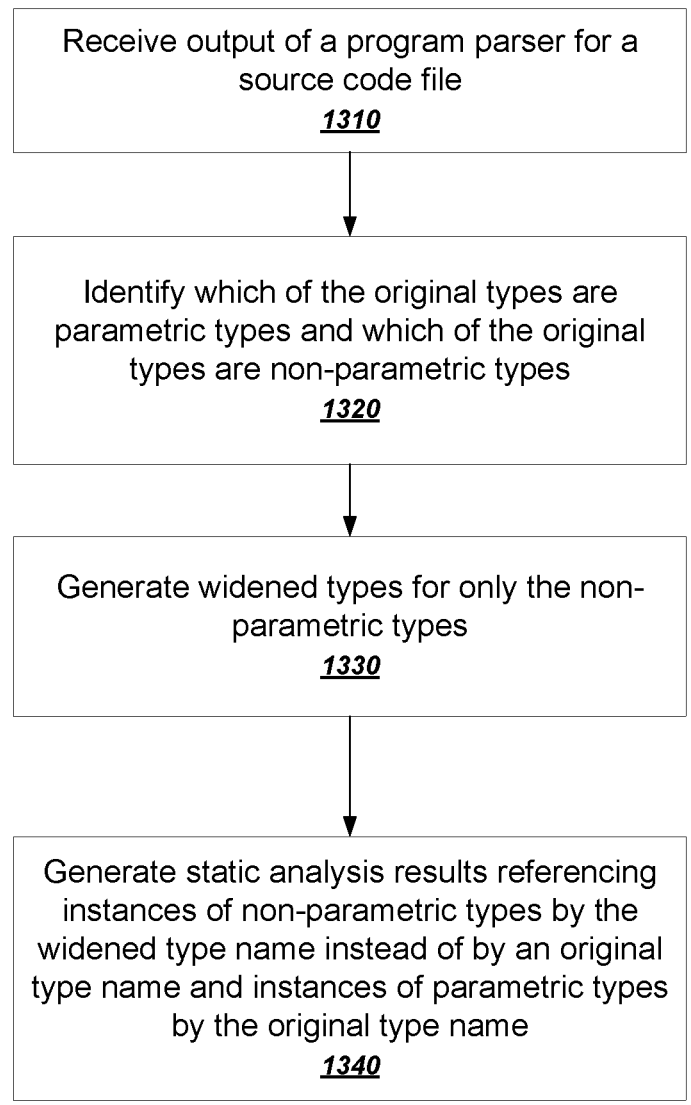
FIG. 13 is a flow chart of an example process for bypassing type widening for parametric types.

FIG. 13 is a flow chart of an example process for bypassing type widening for parametric types. The process will be described as being performed by an appropriately programmed system of one or more computers, e.g., the static analysis system 102 of FIG. 1.

A parametric type is a language construct that includes type constructor being applied to one or more type arguments. For example, Tuple2[String, Int] is a type representing a two-tuple that holds a String and an Int.

For Scala, and for most programming languages, it is best to leave a parametric type as is during type widening. By doing so, it is possible to widen type variables described previously.

To contrast, here is an example that goes wrong if both parametric types and type variables are both widened. Consider the following class definition in Scala:

abstract class Parser[P<: Parser[P]]{
...
}

When P is type widened, it results in Parser[P], which is a parametric type. If parametric types were widened, then the widening needs to continue, because the P in Parser[P] is another type variable. That next step of widening would result in Parser[Parser[P]], which still needs further widening. The process would never terminate.

The system receives the output of a program parser for the source code file (1310).

The system identifies which of the original types are parametric types and which of the original types are non-parametric types (1320).

The system generates widened types only for the non-parametric types (1330). In other words, the system bypasses type widening whenever the system encounters a parametric type.

The system generates static analysis results referencing the source code element by the widened type name instead of by an original type name of the type reference for the source code element (1340).

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving an output generated by a program parser for a source code file, wherein the output identifies a respective original type for each of one or more source code elements in the source code file;
   generating a respective widened type that is different from the respective original type for each of one or more source code elements, wherein each original type and each widened type has a respective type kind, wherein each type kind represents a class of types in a programming language of the source code file and each type kind corresponds to a specific respective analyzer for analyzing compatibility for source code elements of the type kind;
   wherein the source code elements include (i) a first source code element having a first original type that has a first type kind, and (ii) a second source code element having a second original type different from the first original type and that has a second type kind that is different from the first type kind, and wherein after the generating, the first source code element has a first widened type, and the first source code element and the second source code element each have a type that has the same type kind;

analyzing the first source code element and the second source code element using the analyzer that is specific to the same second type kind for the first widened type and the second original type to determine whether the first widened type and the second original type having the same second type kind are incompatible; and generating static analysis results for the source code file, wherein the static analysis results reference each source code element of the one or more source code elements occurring in the static analysis results by a respective widened type name for the source code element instead of by a respective original type name of the source code element for each source code element that has a widened type, and wherein the static analysis results reference the first source code element by a first widened type name for the first widened type.

2. The method of claim 1, wherein generating a respective widened type for each of the one or more source code elements comprises generating a same widened type for at least two source code elements having different original types.

3. The method of claim 1, further comprising generating an augmented representation of the source code file, wherein the augmented representation references each source code element having a widened type by the widened type for the source code element instead of by an original type for the source code element.

4. The method of claim 1, wherein the output comprises a parse tree and further comprising associating the widened types with respective parse nodes corresponding to respective source code elements.

5. The method of claim 4, wherein generating static analysis results for the source code file comprises analyzing the parse tree according to widened types associated with parse nodes of the parse tree.

6. The method of claim 4, further comprising generating a database that associates one or more source code elements represented by parse nodes in the output with respective widened types associated with the parse nodes, wherein generating static analysis results for the source code file comprises querying the database to generate the static analysis results.

7. The method of claim 1, wherein generating static analysis results comprises determining compatibility between widened types for the source code elements.

8. The method of claim 7, wherein determining compatibility between widened types for the source code elements comprises determining whether two widened types are comparable or determining whether a widened type is an expected type.

9. The method of claim 1, wherein generating the respective widened types comprises generating a reduced set of type kinds, the reduced set of type kinds having fewer type kinds than a number of original type kinds for source code elements in the source code file.

10. The method of claim 9, wherein generating the reduced set of type kinds comprises generating a same widened type kind for at least two different original type kinds.

11. The method of claim 1, wherein the output identifies a respective original type for all of the one or more source code elements in the source code file.

12. The method of claim 1, wherein, after generating a respective widened type for each of the one or more source code elements, the first source code element has a widened type that has the second type kind and the second source code element does not have a widened type.

13. The method of claim 1, wherein, after generating a respective widened type for each of the one or more source code elements, the first source code element has a widened type that has a third type kind and the second source code element has a widened type that has the same third type kind.

14. A computer-implemented method comprising:
receiving, by a static analysis system, an output generated by a program parser for a source code file in a particular programming language, wherein:
the particular programming language defines multiple original types, each of the original types belonging to a respective original type kind,
the particular programming language defines, for each original type kind, a different respective procedure for performing type compatibility checks, and
the output associates, with each instance of a source code element in the source code file that has an identifiable type, an original type of the source code element;
generating a reduced set of type kinds, the reduced set of type kinds having fewer type kinds than the original set of type kinds, including assigning, to all instances in the program of source code elements having any original type having a particular first type kind, respective widened types having a different second type kind that is among the reduced set of type kinds, thereby eliminating all instances of source code elements to be analyzed having types belonging to the particular first type kind,
wherein source code elements in the source code file include (i) a first source code element having a first original type that has the first type kind, and (ii) a second source code element having a second original type different from the first original type and that has the second type kind that is among the reduced set of type kinds, and wherein after the generating, the first source code element has a first widened type having the second type kind that is among the reduced set of type kinds;
analyzing the first source code element and the second source code element using an analyzer that is specific to the second type kind that is among the reduced set of type kinds to determine whether the first widened type and the second original type are incompatible; and
generating static analysis results for the source code file using widened types and type kinds among the reduced set of type kinds instead of original types and original type kinds, wherein the static analysis results reference the first source code element by a first widened type name for the first widened type.

15. The method of claim 14, wherein generating a widened type for each of one or more of the source code elements comprises generating a same widened type for at least two source code elements having different original types.

16. The method of claim 14, further comprising generating an augmented representation of the source code file, wherein the augmented representation references each source code element by the widened type for the source code element instead of by an original type for the source code element.

17. The method of claim 14, wherein the output comprises a parse tree and further comprising associating the widened types with respective parse nodes corresponding to the source code elements.

18. The method of claim 17, wherein generating static analysis results for the source code file comprises analyzing the parse tree according to widened types associated with parse nodes of the parse tree.

19. The method of claim 14, further comprising generating a database that associates one or more source code elements represented by parse nodes in the output with respective widened types associated with the parse nodes, wherein generating static analysis results for the source code file comprises querying the database to generate the static analysis results.

20. The method of claim 14, wherein generating static analysis results comprises determining compatibility between widened types for the source code elements.

21. The method of claim 20, wherein determining compatibility between widened types for the source code elements comprises determining whether two widened types are comparable or determining whether a widened type is an expected type.

22. A system comprising:
one or more computers and one or more storage devices storing instructions that are operable, when executed by the one or more computers, to cause the one or more computers to perform operations comprising:
receiving an output generated by a program parser for a source code file, wherein the output identifies a respective original type for each of one or more source code elements in the source code file;
generating a respective widened type that is different from the respective original type for each of one or more source code elements, wherein each original type and each widened type has a respective type kind, wherein each type kind represents a class of types in a programming language of the source code file and each type kind corresponds to a specific respective analyzer for analyzing compatibility for source code elements of the type kind;
wherein the source code elements include (i) a first source code element having a first original type that has a first type kind, and (ii) a second source code element having a second original type different from the first original type and that has a second type kind that is different from the first type kind, and wherein after the generating, the first source code element has a first widened type, and the first source code element and the second source code element each have a type that has the same type kind;
analyzing the first source code element and the second source code element using the analyzer that is specific to the same second type kind for the first widened type and the second original type to determine whether the first widened type and the second original type having the same second type kind are incompatible; and
generating static analysis results for the source code file, wherein the static analysis results reference each source code element of the one or more source code elements occurring in the static analysis results by a respective widened type name for the source code element instead of by a respective original type name of the source code element for each source code element that has a widened type, and wherein the static analysis results reference the first source code element by a first widened type name for the first widened type.

23. The system of claim 22, wherein generating a respective widened type name for each of the one or more source code elements comprises generating a same widened type name for at least two source code elements having different original type names.

24. The system of claim 22, wherein the operations further comprise generating an augmented representation of the source code file, wherein the augmented representation references each source code element having a widened type by the widened type name for the source code element instead of by an original type name for the source code element.

25. The system of claim 22, wherein the output comprises a parse tree and further comprising associating the widened types with respective parse nodes corresponding to respective source code elements.

26. The system of claim 25, wherein generating static analysis results for the source code file comprises analyzing the parse tree according to widened types associated with parse nodes of the parse tree.

27. The system of claim 25, wherein the operations further comprise generating a database that associates one or more source code elements represented by parse nodes in the output with respective widened types associated with the parse nodes, wherein generating static analysis results for the source code file comprises querying the database to generate the static analysis results.

28. A system comprising:
one or more computers and one or more storage devices storing instructions that are operable, when executed by the one or more computers, to cause the one or more computers to perform operations comprising:
receiving, by a static analysis system, an output generated by a program parser for a source code file in a particular programming language, wherein:
the particular programming language defines multiple original types, each of the original types belonging to a respective original type kind,
the particular programming language defines, for each original type kind, a different respective procedure for performing type compatibility checks, and
the output associates, with each instance of a source code element in the source code file that has an identifiable type, an original type of the source code element;
generating a reduced set of type kinds, the reduced set of type kinds having fewer type kinds than the original set of type kinds, including assigning, to all instances in the program of source code elements having any original type having a particular first type kind, respective widened types having a different second type kind that is among the reduced set of type kinds, thereby eliminating all instances of source code elements to be analyzed having types belonging to the particular film type kind,
wherein source code elements in the source code file include (i) a first source code element having a first original type that has the first type kind, and (ii) a second source code element having a second original type different from the first original type and that has the second type kind that is among the reduced set of type kinds, and wherein after the generating, the first source code element has a first widened type having the second type kind that is among the reduced set of type kinds;
analyzing the first source code element and the second source code element using an analyzer that is specific to the second type kind that is among the reduced set of type kinds to determine whether the first widened type and the second original type are incompatible; and
generating static analysis results for the source code file using widened types and type kinds among the reduced set of type kinds instead of original types and original type kinds, wherein the static analysis results reference the first source code element by a first widened type name for the first widened type.

29. The system of claim 28, wherein generating a widened type for each of one or more of the source code elements comprises generating a same widened type for at least two source code elements having different original types.

30. The system of claim 28, wherein the operations further comprise generating an augmented representation of the source code file, wherein the augmented representation references each source code element by the widened type for the source code element instead of by an original type for the source code element.

31. The system of claim 28, wherein the output comprises a parse tree and further comprising associating the widened types with respective parse nodes corresponding to the source code elements.

32. The system of claim 31, wherein generating static analysis results for the source code file comprises analyzing the parse tree according to widened types associated with parse nodes of the parse tree.

33. The system of claim 28, wherein the operations further comprise generating a database that associates one or more source code elements represented by parse nodes in the output with respective widened types associated with the parse nodes, wherein generating static analysis results for the source code file comprises querying the database to generate the static analysis results.

* * * * *